US011989038B2

(12) United States Patent
Borgyos et al.

(10) Patent No.: US 11,989,038 B2
(45) Date of Patent: May 21, 2024

(54) SYSTEMS AND METHODS FOR PROVIDING CONTINGENCY AUTOMATION TO EMERGENCY RESPONSE

(71) Applicant: GE Aviation Systems LLC, Grand Rapids, MI (US)

(72) Inventors: Szabolcs A. Borgyos, Grand Rapids, MI (US); Adam J. Diffenderfer, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 236 days.

(21) Appl. No.: 17/091,320

(22) Filed: Nov. 6, 2020

(65) Prior Publication Data

US 2022/0147064 A1 May 12, 2022

(51) Int. Cl.
| | |
|---|---|
| *B64D 45/04* | (2006.01) |
| *B64C 39/02* | (2023.01) |
| *G05D 1/00* | (2006.01) |
| *G08G 5/00* | (2006.01) |
| *H04L 67/12* | (2022.01) |

(52) U.S. Cl.
CPC .......... *G05D 1/106* (2019.05); *B64C 39/024* (2013.01); *B64D 45/04* (2013.01); *B64U 2201/10* (2023.01); *G08G 5/0056* (2013.01); *H04L 67/12* (2013.01)

(58) Field of Classification Search
CPC .......... G05D 1/106; B64C 39/024; B64C 2201/141; B64D 45/04; G08G 5/0056; H04L 67/12
See application file for complete search history.

(56) References Cited

U.S. PATENT DOCUMENTS

| | | |
|---|---|---|
| 6,739,556 B1 | 5/2004 | Langston |
| 7,167,782 B2 | 1/2007 | Humbard et al. |
| 8,521,343 B2 | 8/2013 | Spinelli |
| 9,257,048 B1 | 2/2016 | Offer et al. |
| 9,626,874 B1 | 4/2017 | Gupta et al. |
| 10,332,405 B2 | 6/2019 | Kopardekar |
| 2013/0179011 A1* | 7/2013 | Colby ................... G05D 1/106 |
| | | 701/16 |
| 2016/0225264 A1* | 8/2016 | Taveira ................. H04W 48/04 |
| 2017/0109245 A1 | 4/2017 | McAlister et al. |

(Continued)

OTHER PUBLICATIONS

Extended European Search Report for EP Application No. 21205734.3 dated Apr. 7, 2022 (10 pages).

*Primary Examiner* — Anne Marie Antonucci
*Assistant Examiner* — Jared C Bean
(74) *Attorney, Agent, or Firm* — Dinsmore & Shohl LLP (57) ABSTRACT

Disclosed herein are embodiments for providing contingency automation to emergency response. One embodiment of a method includes determining a route for a vehicle to a primary destination, and determining a first upcoming area along the route that has been previously identified as an emergency response zone, where the emergency response zone may be used as a secondary destination in a contingency route for the vehicle in an emergency. In some embodiments, the method may include reserving airspace for the contingency route, determining that the emergency response zone is no longer useful, based on an updated position of the vehicle, and canceling the contingency route from reservation.

20 Claims, 7 Drawing Sheets

(56) References Cited

U.S. PATENT DOCUMENTS

| | | |
|---|---|---|
| 2017/0278409 A1* | 9/2017 | Johnson ............... G08G 5/0069 |
| 2018/0253979 A1 | 9/2018 | Rey et al. |
| 2019/0156685 A1 | 5/2019 | Winkle et al. |
| 2019/0235500 A1 | 8/2019 | O'Brien et al. |
| 2019/0235501 A1 | 8/2019 | Cantrell et al. |
| 2021/0225178 A1* | 7/2021 | Kusumi ................. G08G 5/025 |

* cited by examiner

SYSTEMS AND METHODS FOR PROVIDING CONTINGENCY AUTOMATION TO EMERGENCY RESPONSE

FIELD

The present disclosure relates to devices, systems, methods, and non-transitory computer-readable mediums for providing a contingency response, and more specifically, for determining one or more emergency response zones along a route of an unmanned aerial system (UAS).

BACKGROUND

As technology advances, UASs are being utilized more frequently in a variety of contexts. As these UASs are increasing in popularity, UAS range has increased, allowing for operation beyond line of sight. While this drastically increases the capabilities of UASs, problems exist when a malfunction, a range issue, a weather issue, and/or other issue occurs to the UAS that requires a deviation from the intended flight plan. In such situations, the pilot (who may not be able to see the UAS) may not be able to determine the best option for navigating the UAS out of the issue, while maintaining safe operation of the UAS. As such, there is a need for an automated emergency response in such situations.

SUMMARY

Disclosed herein are embodiments for providing contingency automation to emergency response. One embodiment of a method includes determining a route for a vehicle to a primary destination, and determining a first upcoming area along the route that has been previously identified as an emergency response zone, where the emergency response zone may be used as a secondary destination in a contingency route for the vehicle in an emergency. In some embodiments, the method may include reserving airspace for the contingency route, determining that the emergency response zone is no longer useful, based on an updated position of the vehicle, and canceling the contingency route from reservation.

In an embodiment, a system includes a computing device that includes a processor and a memory component, the memory component storing logic that, when executed by the processor causes the system to determine a route for a vehicle to a primary destination and determine a first upcoming area along or adjacent to the route that has been previously identified as an emergency response zone, where the emergency response zone may be used as a secondary destination in a contingency route for the vehicle in an emergency. In some embodiments, the logic may cause the system to reserve airspace for the contingency route or a route to a contingency destination, determine when the emergency response zone is no longer useful, based on an updated position of the vehicle, and cancel the contingency route reservation to the emergency response zone.

In an embodiment, a non-transitory computer-readable medium includes logic for execution by a computing device, the logic configured to cause the computing device to determine a route for a vehicle to a primary destination and determine a first upcoming area along the route that has been previously identified as an emergency response zone, where the emergency response zone may be used as a secondary destination in a contingency route for the vehicle in an emergency. In some embodiments, the logic causes the computing device to reserve airspace for the contingency route, determine that the emergency response zone is no longer useful, based on an updated position of the vehicle, and cancel the contingency route from reservation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

The present disclosure generally relates to devices, systems, and methods for providing contingency automation to emergency response. Specifically, the devices, systems, and methods described herein may be configured to determine a contingency plan, such as a route connecting the route being flown to an emergency response zone for landing the UAS or other vehicle, as well determining new emergency response zones and compensating landowners for use of that land as an emergency response zone.

When planning and/or executing UAS operation, a pilot may have numerous built-in contingency flight plans at his/her disposal. None of these contingency flight plans, however, is typically currently shared with other airspace users. One option for sharing these is during an emergency. In UAS traffic management (UTM) supported collaborative operations, in-flight emergencies result in the UTM system providing notifications to affected users, along with a plan to resolve the issue. Embodiments described herein may be utilized when the vehicle experiences an emergency and is not capable of communicating that emergency to its ground control. A determination must be made regarding the mitigating action: return to home, land in place, fly to some new destination, etc. and that determination/mitigation action must be communicated to other peer airspace users and applications for strategic de-confliction. Embodiments described herein perform collaborative contingency planning and execute planned/de-conflicted mitigating actions, even when the C2 link is down and those actions cannot be communicated directly.

Embodiments described herein may also consider efficient use of airspace. Instead of reserving large swaths of airspace in which to manage the planned contingency responses, these embodiments reserve only as much airspace as required for near term contingencies and then update those as the flight progresses. Thus, these embodiments may recycle airspace as the flight progresses, enabling maximum utilization of airspace, navigation facilities, and airports, such as those defined in the U.S. as the National Airspace System.

Regarding contingency planning automation, embodiments described herein may be configured to utilize dynamic, risk-encompassing routing/flight-planning data. The planned route is updated with adjacent contingency routes and/or airspaces. For each segment or waypoint within the planned route, there could be a plurality of adjacent contingency procedures or airspace volumes that are based on the estimated time of arrival to that location, dynamics or predicted dynamics of the environment at that time, and/or capacity for the airspace to handle contingencies. These routes and/or volumes contain requisite available airspace for the vehicle to respond to a contingency based on triggering criteria. Monitoring for the triggering criteria is performed at least on the vehicle, ground control station, and/or within the UTM system, so that these entities are coordinated once a contingency occurs and can communicate to responsible parties, even when C2 is not available. The contingency routes/airspaces may be de-conflicted with other airspace users' routes prior to the vehicle entering the particular portion of the flight plan. If the space cannot be registered to the user as contingency airspace, the vehicle may need to execute a contingency procedure for not being able to determine contingency airspace.

Regarding contingency airspace recycling, as the flight progresses, contingency routes/airspaces in the past (e.g., rest areas that have been passed on the highway) are recycled. The UTM system releases the contingency plan, associated emergency response zone (also referred to herein as a ditch zone) and the airspace related to the passed plan so that other users can activate related/adjacent airspaces and routes. Contingency procedures only in the near future are reserved for the operator; this increases the operators' ability to gain approval and reduces cost associated with the reservation/flight plan (which includes active, dynamic contingency procedures and airspaces).

It will be understood that the contingency procedures may include a static determination of emergency response zones (e.g., always one mile out). Similarly, some embodiments may utilize a dynamic determination of emergency response zones (e.g., dependent upon speed of vehicle, vehicle operation, current vehicle range, number of emergency response zones detected, etc.).

Regarding emergency response zones, in any region, there are areas where a UAS based emergency could easily be resolved without harm to people or property. In addition, these areas can provide additional benefit to their owner, such as providing a function and/or a feature within a public-facing user interface/user experience (UI/UX) implementation of the UTM system, where users are able to identify possible emergency response zones (e.g., fenced infrastructure facilities like cellular towers). These embodiments may further be configured to perform a site survey and potentially qualify this area as an emergency response zone. When an emergency operation utilizes a specific area (either planning a contingency route our actually landing a vehicle), the owner of that area may be compensated for the service.

In these embodiments, the UTM system may be configured to manage access to local emergency response zone and publish a process for businesses or other third parties to register in order to provide this service. Additionally, determined emergency response zones are safety qualified and mapped within the UTM system. These embodiments may also receive a user specified route/flight plan. The UTM system/services will manage contingency airspace and paths from the active (user registered route and airspace) to these emergency response zones.

The UTM system may recycle the paths from the active plan to the emergency management areas during flight to minimize the airspace used. The UTM system recycles the contingency paths/airspace automatically with the vehicle during the operation without pilot interaction. If the C2 link is lost or other hazard arises, the vehicle can execute already de-conflicted playbook route/procedure to emergency management areas.

Additionally, the UTM system may monitor operating environment for pop-up hazards and dynamically generate new contingency plans in response. The UTM system may also notify operator of pop-up hazards and mitigations.

Figure 1:
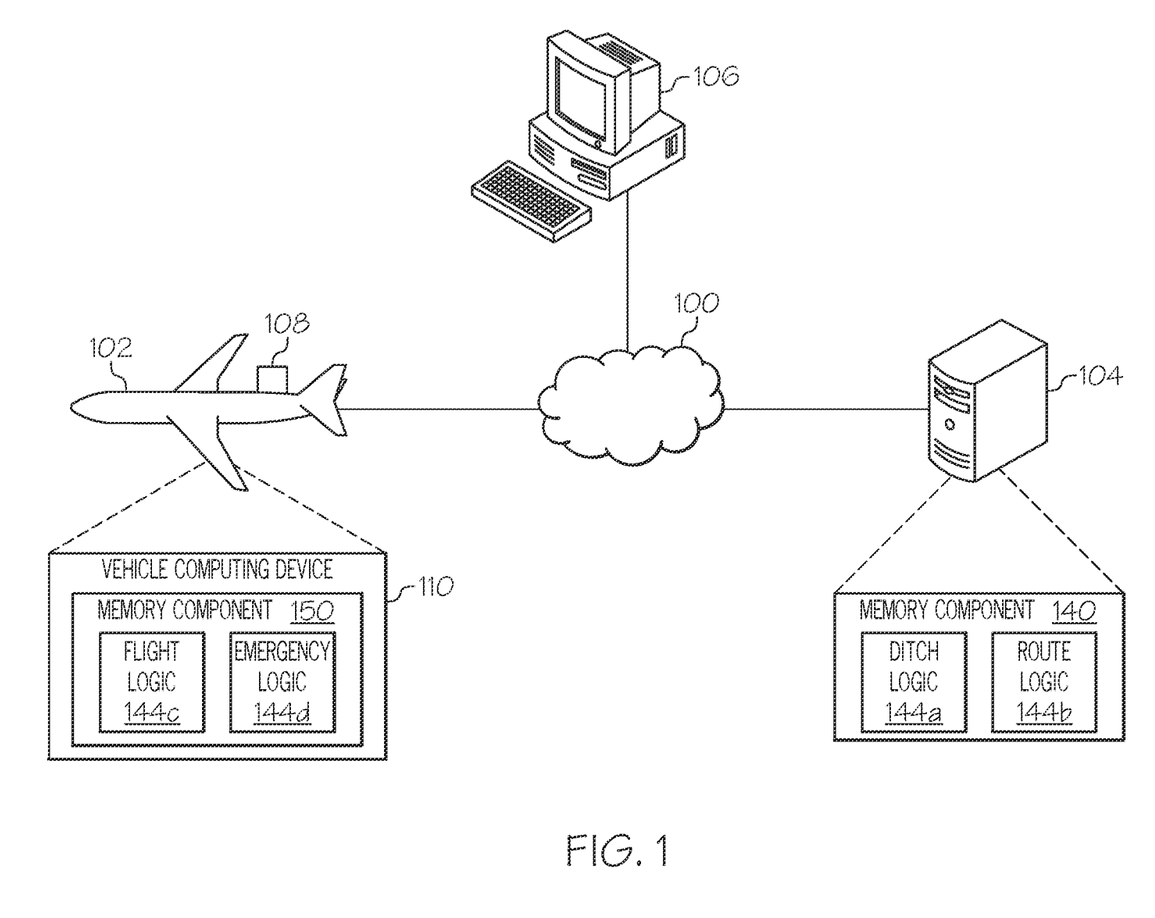
FIG. 1 schematically depicts a network environment for providing contingency automation to emergency response zones, according to one or more embodiments shown and described herein.

Referring now to the drawings, FIG. 1 schematically depicts a network environment for providing contingency automation to emergency response zones, according to one or more embodiments shown and described herein. As illustrated, the network environment may include a network 100, such as the internet, public switched telephone network, mobile telephone network, mobile data network, local network (wired or wireless), peer-to-peer connection, and/or other network for providing the functionality described herein.

Coupled to the network 100 are a vehicle 102, a remote computing device 104, and a user computing device 106. The vehicle 102 may be configured as one or more aerial and/or terrestrial vehicles that is supports the functionality provided herein. As an example, the vehicle 102 may include an airplane, drone, helicopter, land/air vehicle, etc. The vehicle 102 may also include a sensor 108, such as a camera, antenna, communications hardware, and/or other hardware for providing the functionality described herein. The vehicle 102 may also include a vehicle computing device 110. The vehicle computing device 110 may include a memory component 150, which stores flight logic 144*c* and emergency logic 144*d*.

The flight logic 144*c* may be configured to cause the vehicle 102 to determine a route to a destination. This determination may include communicating with the remote computing device 104, the user computing device 106, calculating the route itself, and/or via other mechanism. Similarly, the emergency logic 144*d* may be configured for causing the vehicle 102 to determine when an emergency situation has occurred and/or determine the appropriate actions to take to overcome the emergency. Again, this may include communication with the remote computing device 104, the user computing device 106, calculating a solution itself, and/or utilizing other mechanisms. The vehicle computing device 110 may include other hardware, as described with reference to the remote computing device 104 in FIG. 7, below.

Also coupled to network 100 is the remote computing device 104 The remote computing device 104 represents one or more different computing devices for providing the functionality provided herein and, as such, may be configured as a server, a personal computer, tablet, database, mobile device, and/or other computing device for providing the functionality described herein. Specific examples include the UTM system, a mapping system, a third party computing device, and/or other computing device. The remote computing device 104 may include a memory component 140, which may store ditch logic 144a and route logic 144b. The ditch logic 144a may be configured to cause the remote computing device 104 to determine and/or communicate one or more emergency response zones. Similarly, the route logic 144b may be configured to cause the remote computing device 104 to determine a route to the vehicle 102.

Also coupled to the network 100 is the user computing device 106. The user computing device 106 may represent one or more computing devices that is operated by a user (or pilot) of the vehicle 102. As will be understood, the user computing device 106 may include hardware and/or software, similar to that described in reference to the remote computing device 104. In some embodiments, the user may input an origination and/or destination point for determining a flight plan. Additionally, some embodiments may provide information on current flight plans of the vehicle 102 and/or other vehicles.

Figure 2:
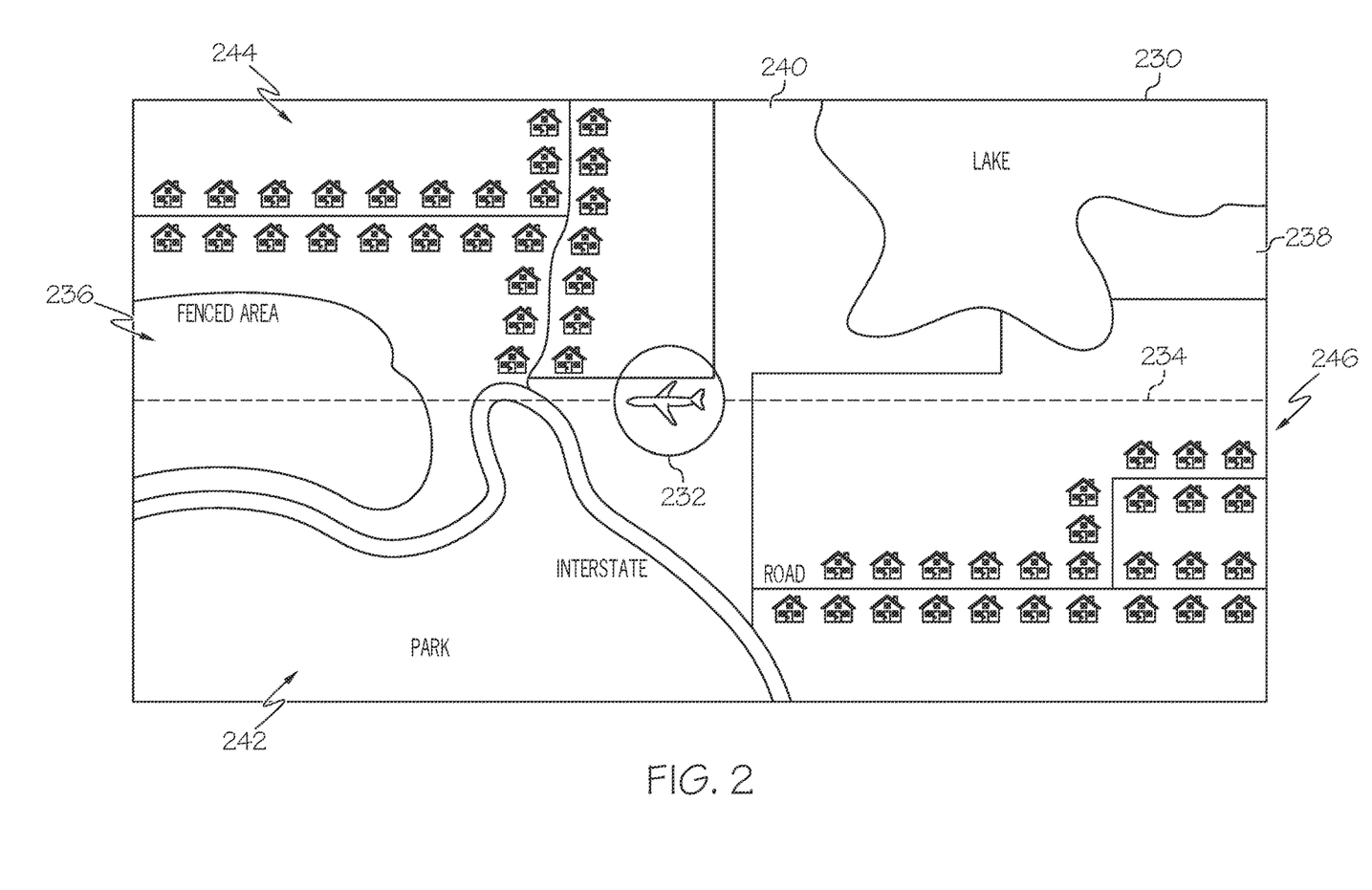
FIG. 2 schematically depicts a user interface of an overhead view of a route being taken by a vehicle, according to one or more embodiments shown and described herein.

FIG. 2 schematically depicts a user interface 230 of an overhead view of a route being taken by a vehicle 102, according to one or more embodiments shown and described herein. As illustrated, the user interface 230 may be provided to the remote computing device 104 and/or user computing device 106. Similarly, some embodiments may be configured such that the user interface 230 is not provided, but FIG. 2 represents data calculated by the remote computing device 104 and/or provided by the remote computing device 104 to the vehicle computing device 110 and/or user computing device 106.

Regardless, the user interface 230 provides a vehicle icon 232 representing the vehicle 102. The user interface 230 additionally provides a real time (or near real time) depiction of the area that the vehicle 102 is currently traversing. This depiction may be retrieved from global positioning data, and/or other source. The user interface 230 may also provide a flight path line 234, which represents the current path that the vehicle 102 has taken and will take according to the current flight plan. The user interface 230 may also provide at least one ground feature around the flight path that the vehicle 102 is taking. As an example, the user interface 230 may provide a fenced area 236, a first remote area 238, a second remote area 240, a park 242, a third remote area 244, and a neighborhood 246. Depending on the particular embodiment, these ground features may or may not be labeled in the user interface 230.

Accordingly, embodiments described herein may identify one or more of these ground features and determine suitability of the ground features as an emergency response zone. Depending on the particular embodiment, the vehicle 102 may utilize the sensor 108 for capturing data of the land below the vehicle 102. The vehicle computing device 110, the remote computing device 104, and/or the user computing device 106 may then make a determination regarding whether any areas may be suitable. In these embodiments, a determination may then be made regarding the landowner of that area and contact with that landowner may be made for using and compensating the landowner for making the area an emergency response zone.

Similarly, some embodiments may be configured for a user to identify potential areas. The potential areas may be sent to the remote computing device 104 and the remote computing device 104 and/or an administrator may contact the landowner about the opportunity. In some embodiments, the landowner may simply apply for using an area of land as an emergency response zone. In these embodiments, after receiving contact from the landowner, an assessment of the area's suitability may be performed.

Figure 3:
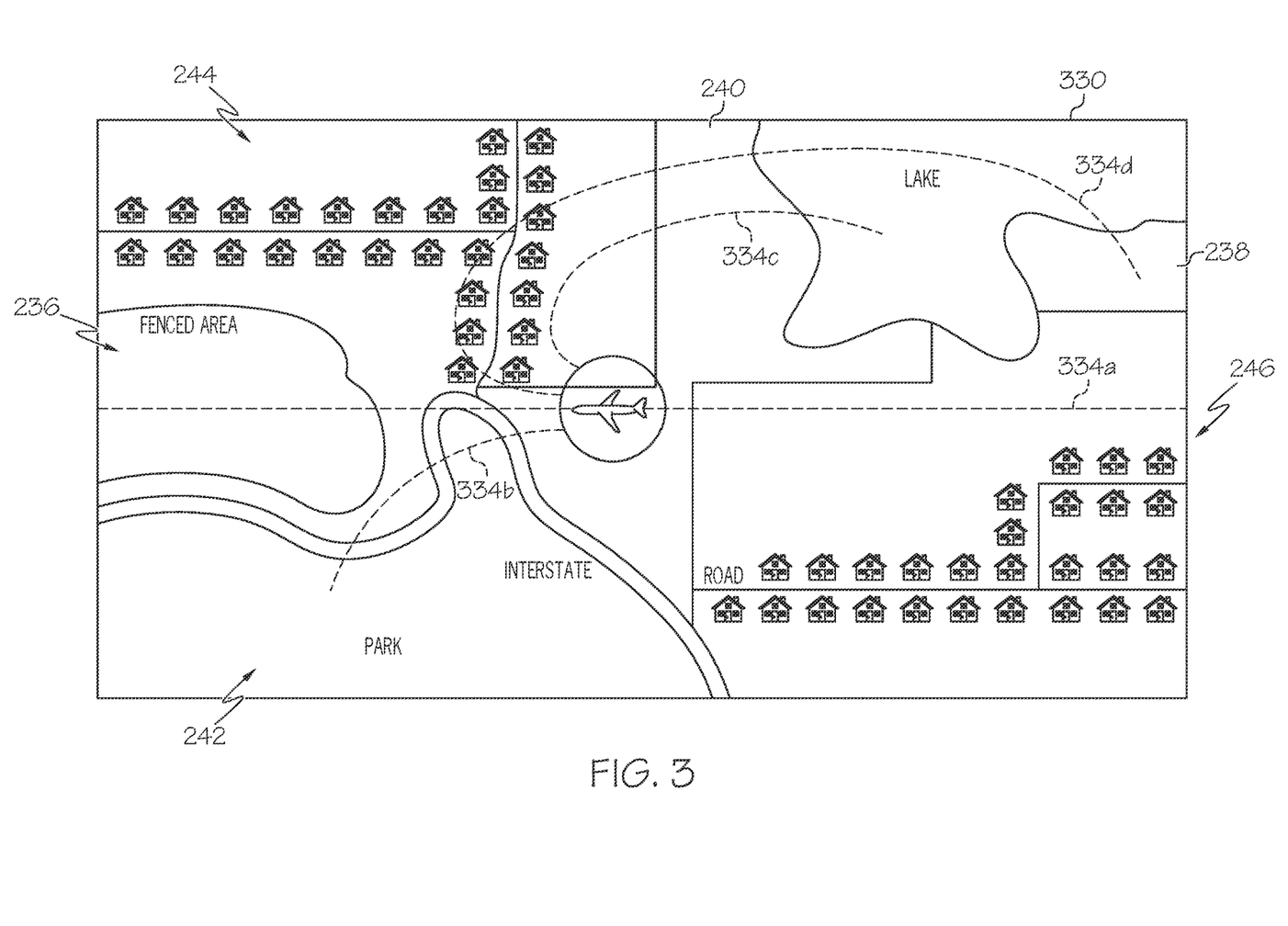
FIG. 3 schematically depicts a user interface of another overhead view of a route being taken by a vehicle with a plurality of contingency actions provided, according to one or more embodiments shown and described herein.

FIG. 3 schematically depicts a user interface 330 of another overhead view of a route being taken by a vehicle 102 with a plurality of contingency actions provided 334b, 334c, 334d, according to one or more embodiments shown and described herein. As illustrated, the vehicle 102 may be traversing a route 334a. As the vehicle 102 traverses the route 334a, embodiments described herein may be configured to utilize the sensor 108 (and/or other mechanisms, such as a vehicle database, flight logic that determine the utility of a given emergency response zone due to flight plan and vehicle proximity) to identify previously designated emergency response zones, such as the fenced area 236, the first remote area 238, the second remote area 240, the park 242, the third remote area 244, etc. Upon determining the previously designated emergency response zones, embodiments may be configured to prioritize these zones and create contingency routes to those emergency response zones, in case an emergency occurs. By creating these contingency routes, embodiments may reserve the four dimensional airspace for those routes. As the vehicle 102 continues to traverse the route 334a and reassesses the best contingency routes for the current position and condition of the vehicle 102, the previously identified contingency paths may be recycled, thereby allowing other vehicles to reserve the corresponding airspace.

Figure 4:
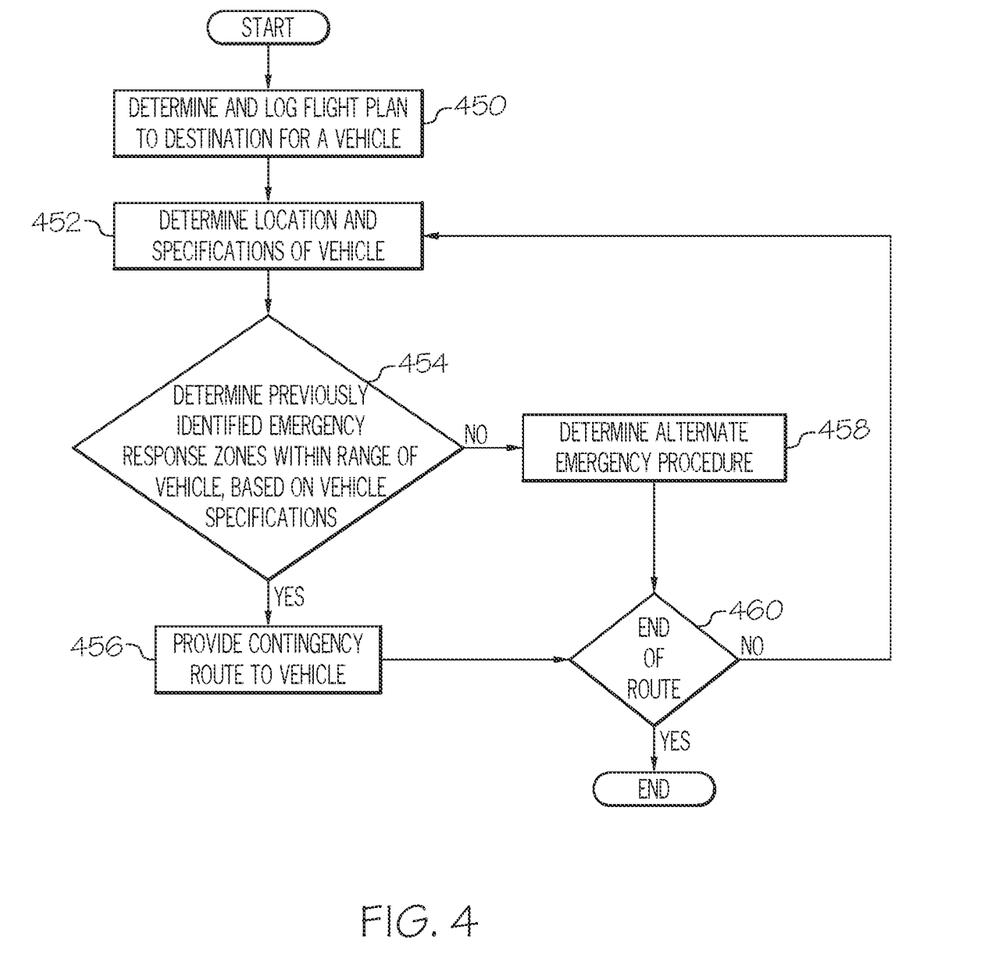
FIG. 4 depicts a flowchart for determining an emergency procedure for a vehicle, according to one or more embodiments shown and described herein.

FIG. 4 depicts a flowchart for determining an emergency procedure for a vehicle 102, according to one or more embodiments shown and described herein. As illustrated in block 450, a flight plan to a destination may be determined and logged for a vehicle 102. In block 452, a location and at least one specification of the vehicle 102 may be determined. Specifications may include range, weight, wingspan, speed, fuel level, fuel efficiency, and/or other specifications that could affect determination and prioritization of contingency routes for the vehicle 102. In block 454, a previously identified emergency response zones within range of the vehicle 102 may be determined, based on the specifications of the vehicle 102. If there are not available emergency response zones, the process proceeds to block 458 to determine an alternate emergency procedure. An alternate emergency procedure may include circling, returning to the origination point of the vehicle 102, parachuting the vehicle 102, and/or performing other actions. In block 460, a determination may be made regarding whether the route is complete. If so, the process ends. If not, process returns to block 452.

If at block 454, there are available emergency response zones, the process proceeds to block 456 to provide a contingency route to the vehicle 102 to land in an emergency response zone. Providing a contingency route may include authorizing the vehicle 102 to route to and land at the emergency response zone in case of emergency. Additionally, the remote computing device 104 (e.g., UTM system) determines whether the airspace containing both the route to and the emergency response zone are available and/or not reserved by another user. This reservation process may entail de-confliction of airspace with peering UTMs (or peer-operators) prior to authorizing contingency route and emergency response zone. If a plurality of emergency response zones are identified, these may be prioritized and/or filtered. The process then proceeds to block 460.

It should be understood that while in FIG. 4, the process first determines emergency response zones and if none are available, then determines alternate emergency procedures; this is merely one example. In some embodiments, all emergency procedures are determined and then those procedures are prioritized and/or filtered, such that the best procedure is taken by the vehicle 102, in the event of an emergency.

It should also be understood that, depending on the type of emergency that the vehicle 102 actually encounters, the highest priority emergency might change. Specifically, if the vehicle 102 loses power, the range may be greatly affected, thus limiting options. If, however, upcoming weather is the determined emergency, there may be more freedom to choose the highest priority procedure.

Figure 5:
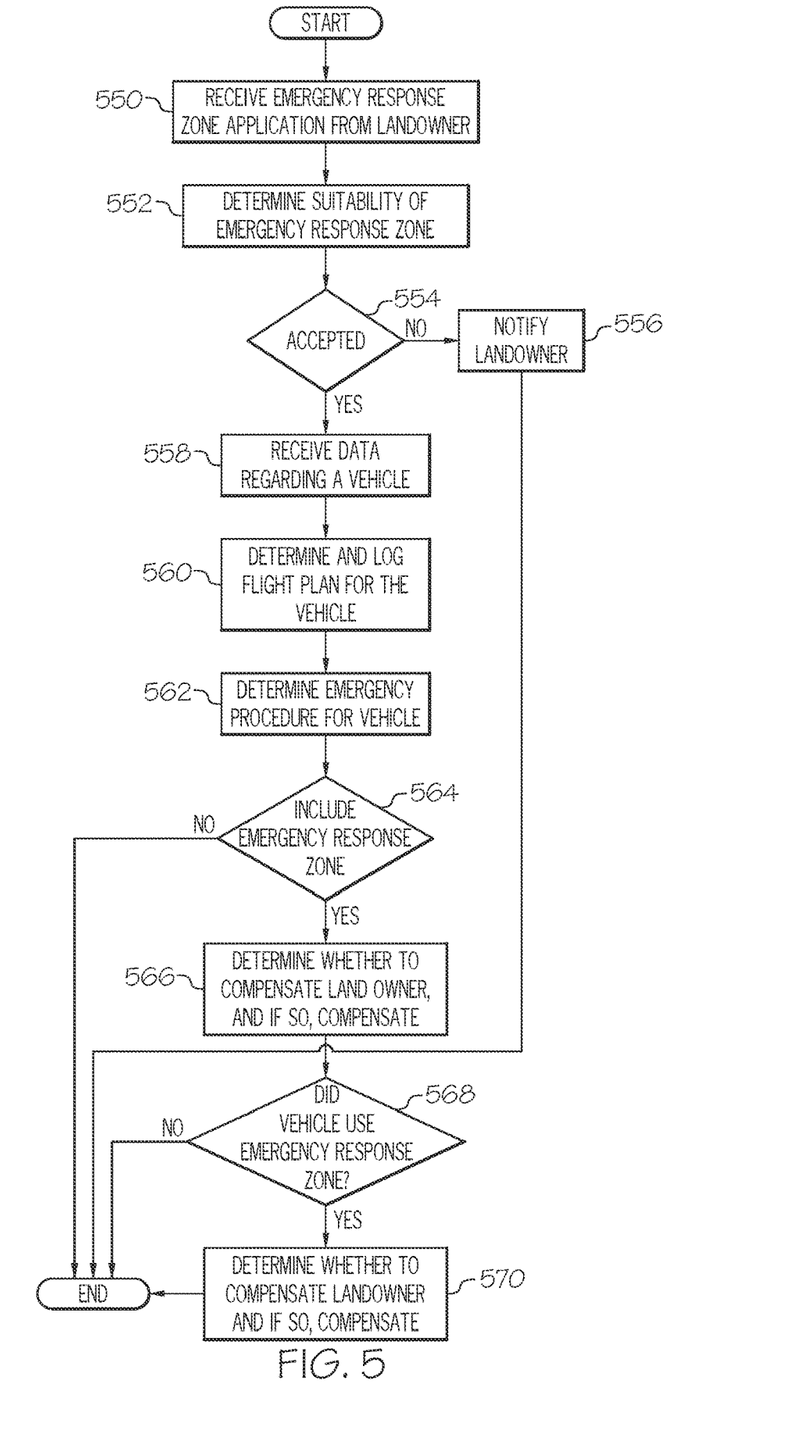
FIG. 5 depicts, a flowchart for determining whether to approve an emergency response zone for a vehicle, according to one or more embodiments shown and described herein.

FIG. 5 depicts a flowchart for determining whether to approve an emergency response zone for a vehicle 102, according to one or more embodiments shown and described herein. As illustrated in block 550, an emergency response zone application may be received from a landowner. As discussed above, some embodiments may have the vehicle 102, remote computing device 104, user computing device 106, administrator, or other third party first identify the area. Regardless, if the landowner wishes to use at least a portion of his/her property as an emergency response zone, an application may be submitted. As an example, the landowner may access the remote computing device 104 (e.g. the UTM system interface), uses the tools provided therein to identify and/or map a private area of the landowner as an available emergency response zone. There may be a survey that is conducted, or the landowner may provide the equivalent data via mapping with a sensor, such as a camera. Regardless, the landowner provide information regarding at least one time that the area will be available (e.g., time of day, duration, etc.) and/or one or more time that the area will not be available. The landowner may also be provided a mechanism for deactivating the private area after being made available. As an example, if there is maintenance or some other planned activity, the landowner has the ability to deactivate the area during that time or otherwise identify when the area is not available.

In block 552, the suitability of the area as an emergency response zone is determined. In block 554, if the area is not accepted as an emergency response zone, in block 556, the landowner is notified and the process ends. However, if the area is accepted, at block 558 data regarding a vehicle 102 is received. As discussed above, the data may include location, characteristics, identification, etc.

In block 560, a flight plan for the vehicle 102 may be determined and logged. Specifically, during planning and/or operation, a list/mapping of relevant emergency response zones to the operation of the vehicle 102 may be provided. A determination may be made regarding which ones are close enough, which can handle their specific type of vehicle, and which are active. If there are no qualified sites, the vehicle operator may qualify his/her own emergency response zones.

In block 562, an emergency procedure for the vehicle 102 may be determined. In block 564, a determination is made if the emergency procedure includes an emergency response zone. If not, the process ends. If the emergency procedure does include an emergency response zone, in block 566 a determination is made regarding whether to compensate the landowner for allowing the flight plan to include the landowner's area. If so, compensation may be made. In block 568, a determination is made regarding whether the landowner's area was actually used as an emergency response zone. If not, the process may end. If the landowner's area was actually used, in block 570, a determination may be made regarding whether to compensate the landowner and, if so, compensation may be made.

Figure 6:
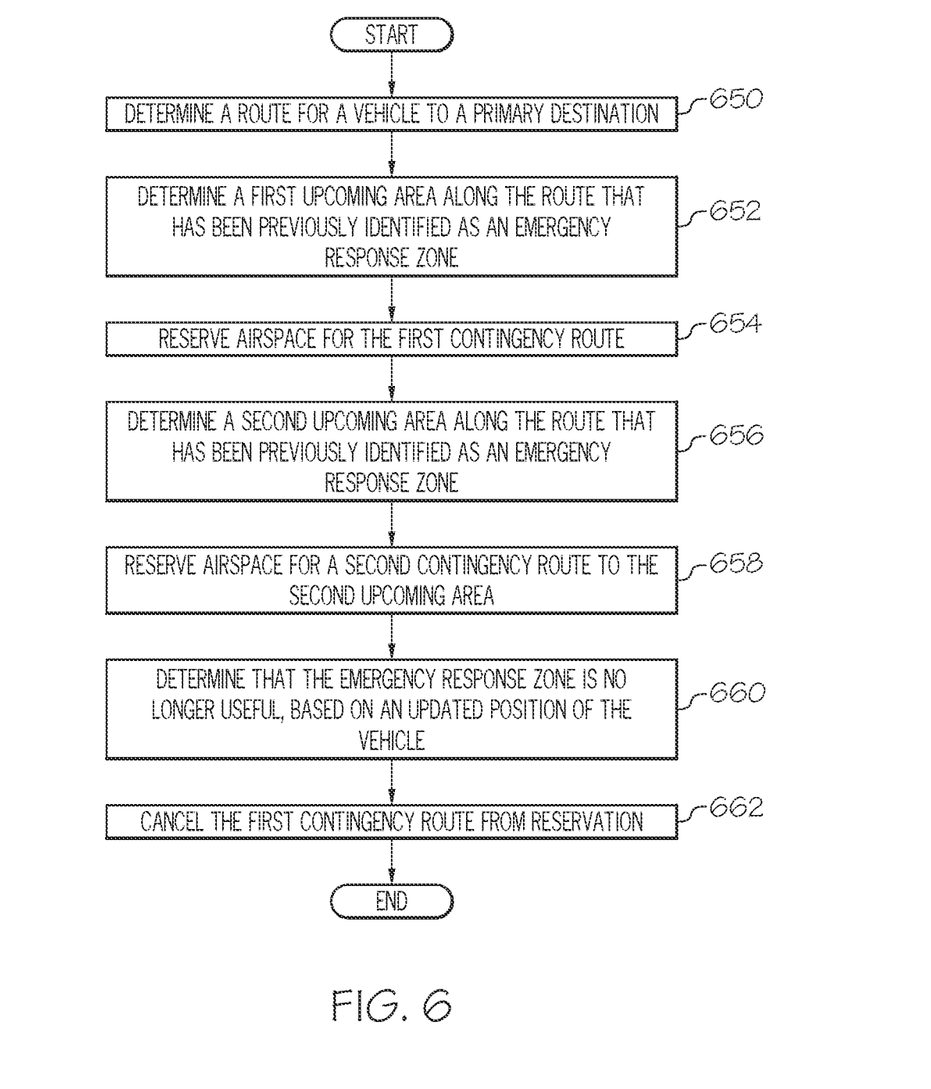
FIG. 6 depicts a flowchart for providing contingency automation to emergency response, according to embodiments described herein.

FIG. 6 depicts a flowchart for providing contingency automation to emergency response, according to embodiments described herein. As illustrated in block 650, a route for a vehicle 102 to a primary destination may be determined. In block 652, a determination may be made regarding a first upcoming area along the route that has been previously identified as an emergency response zone, where the emergency response zone may be used as a secondary destination in a first contingency route for the vehicle 102 in an emergency. In block 654, airspace for the first contingency route may be reserved. In block 656, a second upcoming area along the route that has been previously identified as an emergency response zone may be determined. In block 658, airspace for a second contingency route to the second upcoming area may be reserved. In block 660, a determination may be made that the emergency response zone is no longer useful, based on an updated position of the vehicle 102. In block 662, the first contingency route reservation may be canceled. As discussed above, the fist contingency route may be recycled for others to use.

Figure 7:
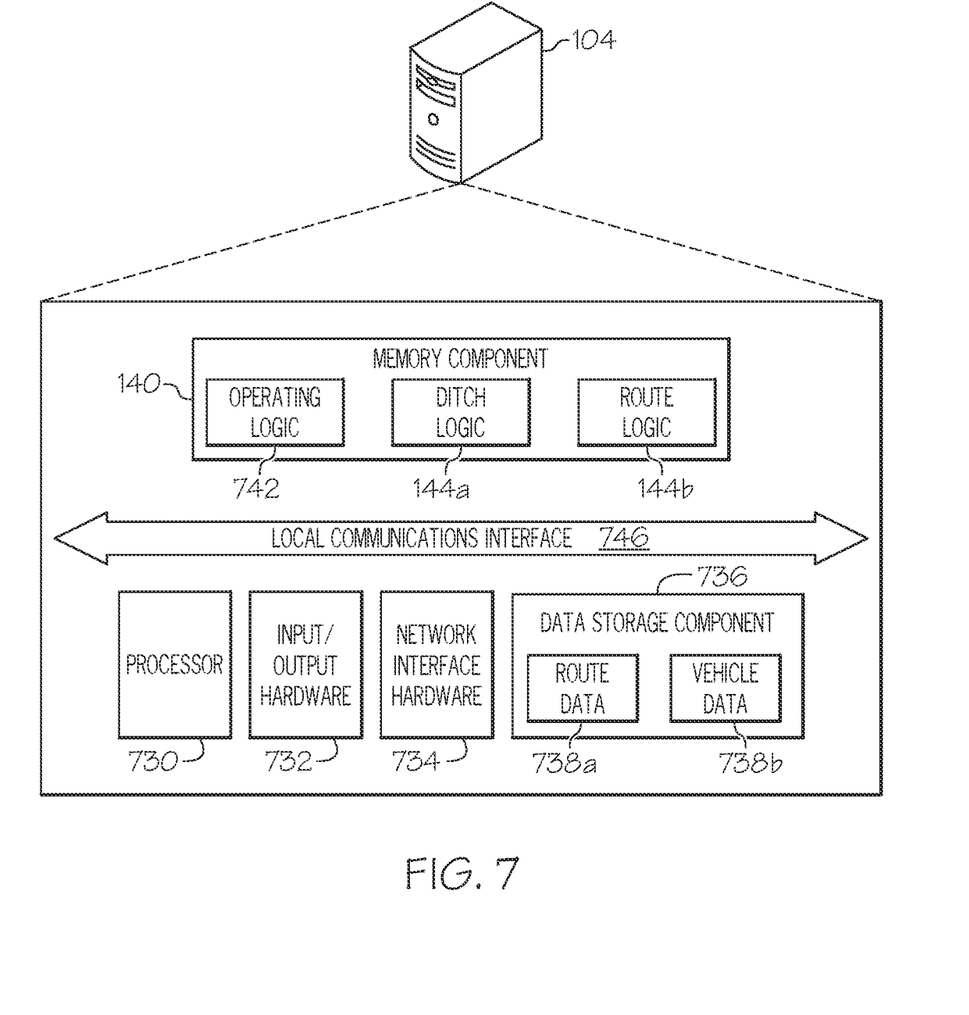
FIG. 7 depicts a remote computing device that may be utilized for providing contingency automation to emergency response, according to embodiments described herein.

FIG. 7 depicts a remote computing device 104 that may be utilized for providing contingency automation to emergency response, according to embodiments described herein. As illustrated, the remote computing device 104 includes a processor 730, input/output hardware 732, network interface hardware 734, a data storage component 736 (which stores route data 738*a*, vehicle data 738*b*, and/or other data), and the memory component 140. The memory component 140 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating system logic 742, the ditch logic 144*a* and the route logic 144*b*. The ditch logic 144*a* and the route logic 144*b* may each include a plurality of different pieces of logic, each of which may be embodied as a computer program or module, firmware, and/or hardware, as an example. A local interface 746 is also included in FIG. 7 and may be implemented as a bus or other communication interface to facilitate communication among the components of the remote computing device 104.

The processor 730 may include any processing component operable to receive and execute instructions (such as from a data storage component 736 and/or the memory component 140). As described above, the input/output hardware 732 may include and/or be configured to interface with the components of FIG. 7.

The network interface hardware 734 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 104 and other computing devices, such as those depicted in FIG. 1.

The operating system logic 742 may include an operating system and/or other software for managing components of the remote computing device 104. As discussed above, the ditch logic 144a may reside in the memory component 140 and may be configured to cause the processor 730 to determine one or more emergency response zones, as described above. Similarly, the route logic 144b may be utilized to determine a route for a UAS and/or provide other similar functionality.

It should be understood that while the components in FIG. 7 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the ditch logic 144a and the route logic 144b may reside on different computing devices. As another example, one or more of the functionalities and/or components described herein may be provided by a remote computing device 104, the user computing device 106, and/or other devices, which may be coupled to the remote computing device 104 via a network connection (wired or wireless). These devices may also include hardware and/or software for performing the functionality described herein.

Additionally, while the remote computing device 104 is illustrated with the ditch logic 144a and the route logic 144b as separate logical components, this is also an example. In some embodiments, a single piece of logic may cause the hub to provide the described functionality.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

A method for providing contingency automation to emergency response zones comprising determining, by a computing device, a route for a vehicle to a primary destination; determining, by the computing device, a first upcoming area along the route that has been previously identified as an emergency response zone, wherein the emergency response zone may be used as a secondary destination in a first contingency route for the vehicle in an emergency; reserving airspace for the first contingency route; determining, by the computing device, a second upcoming area along the route that has been previously identified as an emergency response zone; reserving, by the computing device, airspace for a second contingency route to the second upcoming area; determining, by the computing device, that the emergency response zone is no longer useful, based on an updated position of the vehicle; and canceling, by the computing device, the first contingency route from reservation.

The method of any preceding clause, further comprising providing an option to a landowner to utilize a private area of the landowner as an available emergency response zone; and receiving data regarding the private area from the landowner, wherein the data includes at least one of the following: one or more times for when this area is available or one or more time when the area will not be available.

The method of any preceding clause, further comprising providing an option for the landowner to deactivate the private area.

The method of any preceding clause, further comprising determining, by the computing device, a plurality of alternate emergency procedures, wherein the plurality of alternate emergency procedures includes routing to at least one of the following: the first upcoming area or the second upcoming area; prioritizing, by the computing device, the plurality of alternate emergency procedures; and filtering, by the computing device, the plurality of alternate emergency procedures to identify a subset of desired alternate emergency procedures.

The method of any preceding clause, further comprising determining, by the computing device, an emergency has occurred; determining, by the computing device, an emergency procedure for resolving the emergency, wherein the emergency procedure includes directing the vehicle along the first contingency route and landing the vehicle at the emergency response zone; and landing, by the computing device, the vehicle in the emergency response zone.

The method of any preceding clause, wherein determining the emergency response zone is determined, based on at least one specification of the vehicle, wherein the at least one specification of the vehicle includes at least one of the following: range, weight, wingspan, speed, fuel level, or fuel efficiency.

The method of any preceding clause, further comprising reserving, by the computing device, airspace for the second contingency route.

The method of any preceding clause, wherein the first upcoming area and the second upcoming area are identical and wherein the first contingency route and the second contingency route are different.

A system for providing contingency automation to emergency response zones, the system comprising a remote computing device that includes a processor and a memory component, the memory component storing logic that, when executed by the processor causes the system to perform at least the following: determine a route for a vehicle to a primary destination; determine a first upcoming area along the route that has been previously identified as an emergency response zone, wherein the emergency response zone may be used as a secondary destination in a first contingency route for the vehicle in an emergency; reserve first airspace for the first contingency route; determine a second upcoming area along the route that has been previously identified as an emergency response zone; determine that the emergency response zone is no longer useful, based on an updated position of the vehicle; and cancel the first contingency route from reservation.

The system of any preceding clause, wherein the logic further causes the system to perform at least the following: provide an option to a landowner to utilize a private area of the landowner as an available emergency response zone; and receive data regarding the private area from the landowner, wherein the data includes at least one of the following: one or more times for when this area is available or one or more time when the area will not be available.

The system of any preceding clause, wherein the logic further causes the system to provide an option for the landowner to deactivate the private area.

The system of any preceding clause, wherein the logic further causes the system to perform at least the following: determine a plurality of alternate emergency procedures, wherein the plurality of alternate emergency procedures includes routing to at least one of the following: the first upcoming area or the second upcoming area; prioritize the plurality of alternate emergency procedures; and filter the plurality of alternate emergency procedures to identify a subset of desired alternate emergency procedures.

The system of any preceding clause, wherein the logic further causes the system to perform at least the following: determine an emergency has occurred; determine an emergency procedure for resolving the emergency, wherein the emergency procedure includes directing the vehicle along the first contingency route and landing the vehicle at the emergency response zone; and land the vehicle in the emergency response zone.

The system of any preceding clause, wherein determining the emergency response zone is determined, based on at least one specification of the vehicle, wherein the at least one specification of the vehicle includes at least one of the following: range, weight, wingspan, speed, fuel level, or fuel efficiency.

The system of any preceding clause, wherein the logic further causes the system to reserve second airspace for a second contingency route to reach the second upcoming area.

The system of any preceding clause, wherein subsequent areas along the route that were previously identified as emergency response zones are identified as contingency destinations, as the vehicle traverses the route.

A non-transitory computer-readable medium for providing contingency automation to emergency response zones, the non-transitory computer-readable medium including logic for execution by a computing device, the logic configured to cause the computing device to perform at least the following: determine a route for a vehicle to a primary destination; determine a first upcoming area along the route that has been previously identified as an emergency response zone, wherein the emergency response zone may be used as a secondary destination in a contingency route for the vehicle in an emergency; reserve airspace for the contingency route; determine that the emergency response zone is no longer useful, based on an updated position of the vehicle; and cancel the contingency route from reservation.

The non-transitory computer-readable medium of any preceding clause, wherein the logic further causes the computing device to perform at least the following: determine a landowner for the emergency response zone; determine whether to compensate the landowner for use of the emergency response zone; and in response to determining to compensate the landowner, compensate the landowner.

The non-transitory computer-readable medium of any preceding clause wherein the logic further causes the computing device to perform at least the following: capture data along the route related to a ground feature; determine whether the ground feature is a suitable emergency response zone; and in response to determining that the ground feature is suitable, create a new emergency response zone for future routes.

The non-transitory computer-readable medium of any preceding clause wherein subsequent areas along the route that were previously identified as emergency response zones are identified as contingency destinations, as the vehicle traverses the route.

What is claimed is:

1. A method for providing contingency automation to emergency response zones comprising:
   determining, by a computing device, a route for a vehicle to a primary destination;
   determining, by the computing device, a first upcoming area along the route of the vehicle while the vehicle is traversing the route that has been previously identified as an emergency response zone, wherein the emergency response zone may be used as a secondary destination in a first contingency route for a future emergency, wherein the first upcoming area is determined for use as the emergency response zone, based on a dynamic determination that depends on at least one of the following: a speed of vehicle, a current vehicle range, and a number of emergency response zones detected;
   reserving, by the computing device, airspace for the first contingency while the vehicle is traversing the route and before the future emergency has occurred;
   determining, by the computing device, a second upcoming area along the route that has been previously identified as an emergency response zone;
   reserving, by the computing device, airspace for a second contingency route to the second upcoming area;
   determining, by the computing device, that the emergency response zone is no longer usable, based on an updated position of the vehicle; and
   canceling, by the computing device, the first contingency route.

2. The method of claim 1, further comprising:
   providing an option to a landowner to utilize a private area of the landowner as an available emergency response zone; and
   receiving data regarding the private area from the landowner, wherein the data includes at least one of the following: one or more times for when this area is available or one or more time when the area will not be available.

3. The method of claim 2, further comprising providing an option for the landowner to deactivate the private area.

4. The method of claim 1, further comprising:
   determining, by the computing device, a plurality of alternate emergency procedures, wherein the plurality of alternate emergency procedures includes routing to at least one of the following: the first upcoming area or the second upcoming area;
   prioritizing, by the computing device, the plurality of alternate emergency procedures; and
   filtering, by the computing device, the plurality of alternate emergency procedures to identify a subset of desired alternate emergency procedures.

5. The method of claim 1, further comprising:
   determining, by the computing device, an emergency has occurred;
   determining, by the computing device, an emergency procedure for resolving the emergency, wherein the emergency procedure includes directing the vehicle along the first contingency route and landing the vehicle at the emergency response zone; and
   landing, by the computing device, the vehicle in the emergency response zone.

6. The method of claim 1, wherein determining the emergency response zone is determined, based on at least one specification of the vehicle, wherein the at least one specification of the vehicle includes at least one of the following: range, weight, wingspan, speed, fuel level, or fuel efficiency.

7. The method of claim 1, wherein the first upcoming area and the second upcoming area are identical and wherein the first contingency route and the second contingency route are different.

8. The method of claim 1, wherein subsequent areas along the route that were previously identified as emergency response zones are identified as contingency destinations, as the vehicle traverses the route.

9. A system for providing contingency automation to emergency response zones, the system comprising:
  a remote computing device that includes a processor and a memory component, the memory component storing logic that, when executed by the processor causes the system to perform at least the following:
    determine a route for a vehicle to a primary destination;
    determine a first upcoming area along the route of the vehicle while the vehicle is traversing the route that has been previously identified as an emergency response zone, wherein the emergency response zone may be used as a secondary destination in a first contingency route for a future emergency, wherein the first upcoming area is determined for use as the emergency response zone, based on a dynamic determination that depends on at least one of the following: a speed of vehicle, a current vehicle range, and a number of emergency response zones detected;
    reserve first airspace for the first contingency while the vehicle is traversing the route and before the future emergency has occurred;
    determine a second upcoming area along the route that has been previously identified as an emergency response zone;
    determine that the emergency response zone is no longer usable, based on an updated position of the vehicle; and
    cancel the first contingency route.

10. The system of claim 9, wherein the logic further causes the system to perform at least the following:
  provide an option to a landowner to utilize a private area of the landowner as an available emergency response zone; and
  receive data regarding the private area from the landowner, wherein the data includes at least one of the following: one or more times for when this area is available or one or more time when the area will not be available.

11. The system of claim 10, wherein the logic further causes the system to provide an option for the landowner to deactivate the private area.

12. The system of claim 9, wherein the logic further causes the system to perform at least the following:
  determine a plurality of alternate emergency procedures, wherein the plurality of alternate emergency procedures includes routing to at least one of the following: the first upcoming area or the second upcoming area;
  prioritize the plurality of alternate emergency procedures; and
  filter the plurality of alternate emergency procedures to identify a subset of desired alternate emergency procedures.

13. The system of claim 9, wherein the logic further causes the system to perform at least the following:
  determine an emergency has occurred;
  determine an emergency procedure for resolving the emergency, wherein the emergency procedure includes directing the vehicle along the first contingency route and landing the vehicle at the emergency response zone; and
  land the vehicle in the emergency response zone.

14. The system of claim 9, wherein determining the emergency response zone is determined, based on at least one specification of the vehicle, wherein the at least one specification of the vehicle includes at least one of the following: range, weight, wingspan, speed, fuel level, or fuel efficiency.

15. The system of claim 9, wherein the logic further causes the system to reserve second airspace for a second contingency route to reach the second upcoming area.

16. The system of claim 9, wherein subsequent areas along the route that were previously identified as emergency response zones are identified as contingency destinations, as the vehicle traverses the route.

17. A non-transitory computer-readable medium for providing contingency automation to emergency response zones, the non-transitory computer-readable medium including logic for execution by a computing device, the logic configured to cause the computing device to perform at least the following:
  determine a route for a vehicle to a primary destination;
  determine a first upcoming area along the route of the vehicle while the vehicle is traversing the route that has been previously identified as an emergency response zone, wherein the emergency response zone may be used as a secondary destination in a contingency route for a future emergency, wherein the first upcoming area is determined for use as the emergency response zone, based on a dynamic determination that depends on at least one of the following: a speed of vehicle, a current vehicle range, and a number of emergency response zones detected;
  reserve airspace for the contingency while the vehicle is traversing the route and before the future emergency has occurred;
  determine that the emergency response zone is no longer usable, based on an updated position of the vehicle; and
  cancel the contingency route.

18. The non-transitory computer-readable medium of claim 17, wherein the logic further causes the computing device to perform at least the following:
  determine a landowner for the emergency response zone;
  determine whether to compensate the landowner for use of the emergency response zone; and
  in response to determining to compensate the landowner, compensate the landowner.

19. The non-transitory computer-readable medium of claim 17, wherein the logic further causes the computing device to perform at least the following:
  capture data along the route related to a ground feature;
  determine whether the ground feature is a suitable emergency response zone; and
  in response to determining that the ground feature is suitable, create a new emergency response zone for future routes.

20. The non-transitory computer-readable medium of claim 17, wherein subsequent areas along the route that were previously identified as emergency response zones are identified as contingency destinations, as the vehicle traverses the route.

* * * * *